United States Patent Office 3,199,900
Patented Aug. 10, 1965

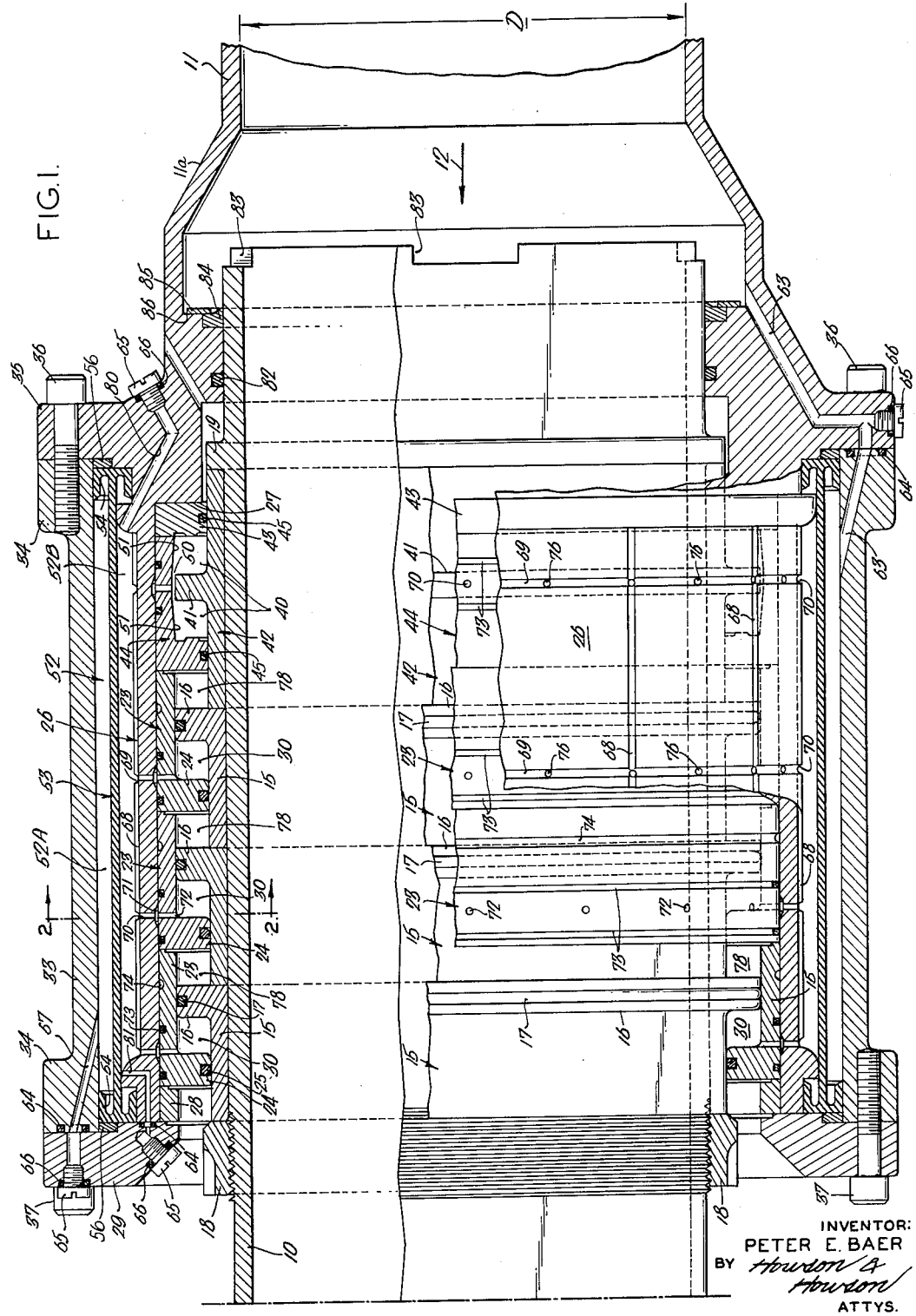

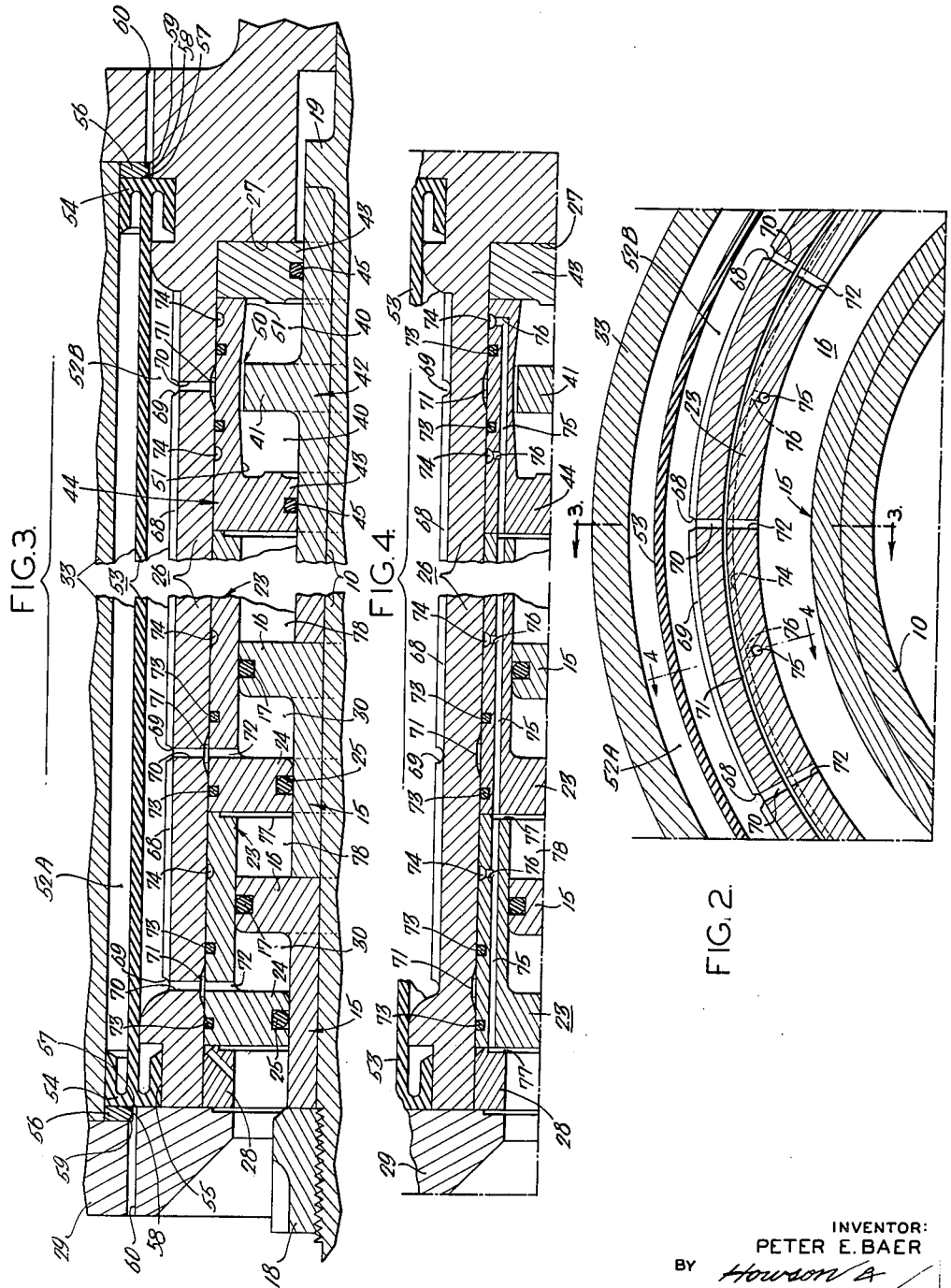

3,199,900
PIPE SLIP JOINT WITH DUAL FLUID PRESSURE BALANCING MEANS AND BUFFER MEANS
Peter E. Baer, Cheltenham, Md., assignor to Dixon Valve & Coupling Company, Philadelphia, Pa., a corporation of Pennsylvania
Filed June 27, 1962, Ser. No. 205,631
5 Claims. (Cl. 285—302)

This invention relates to a pipe slip joint and has for an object the provision of a pipe slip joint which is balanced for dynamic and shock pressure disturbances in a fluid pipe line.

A slip joint is provided in a fluid pipe line to accommodate axial expansion, especially that due to the dynamic flow of liquid and sudden changes in pressure or hammer which acts in the direction of fluid flow.

The present invention provides shock balancing or reaction means which presents a reaction area which is approximately equal to the shock area and which is exposed to the same fluid pressure which exists within the pipe line.

The invention also provides a secondary liquid such as oil for use in the reaction means so as to avoid contamination and damage to the operating parts and provides partitioning means, such as an elastic sheet separation, between the reaction fluid and the fluid within the pipe for equalizing the pressures without mixing of the fluids.

The invention also provides buffer means for the end of the stroke which imposes increasing resistance to movement as the end of the stroke is approached whereby to fully insure against noise and damage to parts.

The objects, advantages and novel features of the invention will be apparent from the following description of an exemplary embodiment, reference being made to the accompanying drawings wherein:

FIG. 1 is an axial section through a pipe slip joint embodying the invention;

FIG. 2 is a partial transverse section taken on the line 2—2, of FIG. 1;

FIG. 3 is an enlarged foreshortened partial axial section taken on the same line as the upper part of FIG. 1, the location of the section being shown on the line 3—3 of FIG. 2; and FIG. 4 is a section like FIG. 1 but taken on a circumferentially turned location, as on the line 4—4 of FIG. 2.

As shown herein, the slip joint assembly comprises an inner pipe joint unit or spigot 10 and an outer pipe joint unit 11 having a socket 11a. It will be assumed that the liquid flows in the direction of the arrow 12 in FIG. 1 so that dynamic and shock pressure act in this direction. The effective area on which the liquid acts is the diameter D of the pipe.

The liquid conveyed by the pipe line may be of various types but it is often of a corrosive character. Salt sea water, for example, is very often handled by such pipe lines.

The reaction means provided by the present invention comprises fluid tight expansion chamber or first chamber means with effective surface area approximately equal to the diameter area of the pipe and subject to the same pressure as that which prevails in the pipe. One expansion chamber might be used but in order to keep the outside clearance area of the assembly as small as possible it is preferable to use a plurality of expansion chambers in parallel.

As shown, the inner pipe unit 10 has secured thereon one or more inner sleeves 15 forming piston members having annular head flanges or radially outwardly projecting shoulders 16. The head flanges are provided on the outer periphery with sealing means such as O-rings 17 to afford fluid tightness for reasons which will become evident hereinafter. The sleeves 15 are rigidly secured to the inner pipe element 10 and, except for assembly purposes, they could be welded or brazed thereto but for convenience, as shown, they are secured by an annular clamp ring 18 threaded on an enlarged portion of the pipe element 10, the reaction against the clamp ring being taken by a flange 19 formed on the pipe element 10 near its end.

Companion expansion chamber reaction means are carried by the outer pipe unit element 11, the means shown comprising on or more outer sleeves 23 having head flanges or inwardly projecting annuli 24 provided interiorly with sealing means such as O-rings 25 having the same purposes as the O-rings 17. The sleeves 23 are rigidly secured inside a first axially extending wall portion 26 carried by the socket 11a, here integral therewith. The pipe extension element or first wall portion 26 has an annular clamping shoulder 27 and the sleeves 23 are clamped against the shoulder 27 by an annular filler ring 28 and an annular clamp ring 29 thereover.

The seals 17 of the inner head flanges 16 slide on the inner cylindrical surface of the outer sleeves 23 and the seals 25 of the outer head flanges 24 slide on the outer cylindrical surface of the sleeves 15, the head flanges 16 and 24 forming between them a plurality of annular fluid reaction chambers 30 of variable size.

A cylindrical enclosure member or second axially extending wall portion 33 having annular enlargements 34 at its ends is secured rigidly to the outer flange 35 of the socket 11a, as by cap screws 36 so as in effect to become a part of the outer pipe unit. At its other end the cylindrical enclosure member has secured thereto, as by cap screws 37, the clamp ring 29 which secures the outer sleeves 23 in place.

In addition to the reaction chambers 30, there is provided one or more buffer chambers 40, the chambers 40 here being formed between an exterior annular flange 41 provided on the mid-length of an inner annular buffer sleeve 42 and interior annular flanges 43 provided on the opposite ends of outer buffer sleeves 44. The flanges 43 carry sealing means such as O-rings 45, which slide on the outer end surfaces of the sleeve 42. The inner buffer sleeve 42 is clamped on the inner pipe unit element 10, along with the reaction sleeves 15, and the outer buffer sleeves 44 are clamped on the extension pipe element 26, along with the outer reaction sleeves 23.

An annular fluid transfer space 50 is provided between the outer periphery of the flange 41 and the inner surfaces 51 of the outer sleeves 44, the surfaces 51 being tapered radially in an axial direction so as to narrow the transfer space radially as the flange 41 moves in either direction from its medial position relative to the tapered surfaces 51. By this arrangement the buffer action due to the flow of fluid through the annular space or passage 50 becomes increasingly effective in both directions away from an intermediate position and at the ends the transfer passage is substantially closed but without permitting the parts to lock or wedge together.

An annular space or chamber 52 of considerable radial depth is provided between the second wall portion 33 and the first wall portion 26. This may be characterized as a pressure transfer space or pressure equalizing space. The chamber 52 is bifurcated or subdivided into two anular spaces 52A, 52B by a flexible elastic annular or tubular separator wall, sheet, or diaphragm means 53, as of oil-resistant elastomeric material which at its ends is provided with sealing means 54. The sealing means as shown is formed integrally on the ends of the annular sheet 53 in an "M" formation, the inner leg of the seal being disposed in an annular groove 55 formed in the pipe extension 26. The end of the seal is backed at the outer side by an annular ring 56 provided with an interior annular vent groove 57, a plurality of circumferentially spaced vent holes 58 and an outer annular groove 59 overlying a plurality of circumferentially spaced vent holes 60 extending through the clamp ring 29.

The outer annular space 52A is connected with the interior pipe space by a plurality of passages or ducts 63. The portions of the ducts at a joint are sealed, as by an O-ring 64, and where drilled portions extend out of a part they are closed by a plug 65 having an O-ring seal 66.

At the other end one or more vent ducts 67 are provided for bleeding air from the space 52A, the same kind of joint seals 64 and closure means 65, 66 being used as for ducts 63.

The inner annular pressure transfer space 52B is connected with the reaction chambers 30 and the buffer chambers 40 by passageways or ducts which are always connected no matter how the intervening sleeves are assembled in circumferential relationship and which are never obstructed by the sheet 53 even if it should move in to lie on the outer surface of the pipe extension 26, which, however, is hardly likely to occur in any normal operating conditions.

On the outer surface of the pipe extension 26 there are provided a plurality of axially spaced annular grooves 69 intersected by a plurality of circumferentially spaced axial grooves 68. In each annular groove 69 there are a plurality of circumferentially spaced radial holes 70 terminating at their inner end in axially spaced inner annular grooves 71 formed on the inner surface of the pipe extension 26. Radial holes 72 in the outer sleeves 23 at the base of the flange 16, where they will never be closed off in use, extend from beneath the annular inner grooves into the reaction chamber 30.

On each side axially of each inner annular groove 71 there is provided an annular seal, as O-rings 73. Venting means are provided for the non-pressure side of the seal rings 73, the venting means also being formed and arranged so as always to be open no matter how the parts are assembled. As shown, there is an annular groove 74 formed in the outer surface of the outer sleeves 23. A plurality of circumferentially spaced axial holes 75 are provided in the sleeves 23 and a plurality of circumferentially spaced radial holes 76 connect the axial holes 74 with the annular grooves 74. Annular recesses 77 are formed on an end of the sleeves 23 from the inner side out past the ends of the axial holes 75. This not only provides that the axial holes of adjacent sleeves are always in communication for any relative circumferentially turned position of the sleeves 23 but also assures that the annular spaces 78 alongside the reaction chambers 30 are always vented to the air. The clamp spacer or filler ring 28 is also provided with a recess 77 on the side over the axial holes 75 for the final vent to air.

A fill passage or duct 80 is provided for the oil chamber 52B, the duct being closed at the outer end after filling by a plug 65 and O-ring 66 as for other externally opening ducts. A vent duct 81 for the chamber 52B is closed after filling by a plug 65 with O-ring seal 66 and is sealed at the assembly joint which it crosses by an O-ring 64.

An annular seal, such as an O-ring 82 is provided between the sliding surfaces between the pipe element 10 and the pipe elements 10 and 11. The end of the pipe element 10 is notched at the end at 83 for a wrench to aid in turning the clamp ring 18 on the inner pipe element 10. An annular scraper ring 84 is provided for cleaning the sliding surfaces between the pipe elements 10 and 11, the scraper being retained by a fastening ring 85 secured to the end wall 86 of a recess provided in the pipe element 11.

In operation, when there is end movement between the pipe units 10 and 11 the reaction chambers 30 change in volume. If the chambers 30 get smaller the oil is forced out into the chamber 52B to force the partition diaphragm outward against the pressure in the outer chamber 52A which is in communication with the interior of the pipe, sea water pressure in the pipe it may be. If the chambers 30 get larger the fluid pressure in chamber 52A will force the annular partition diaphragm inward and force oil into the chambers 30 to keep them filled and to assure that no air can be sucked in.

The buffer chambers 40 are similarly kept filled at prevailing pipe fluid pressure. The manner in which liquid is transferred between chambers 40 for the buffer action has already been explained.

It is thus seen that the invention provides a pipe slip joint which is fully balanced under all conditions and in which there is never any intermixture between pipe liquid and balancing liquid; also that the parts are formed to provide fluid connection channels and venting channels in any assembled relationship of parts; also that the parts are of a simple design so as to be readily made by ordinary machining tools and practices.

While one embodiment of the invention has been described for purposes of illustration, it is to be understood that there may be various embodiments and modifications within the general scope of the invention.

I claim:

1. A pipe line slip joint comprising in combination, an outer pipe including a socket having an axially extendng wall portion, a spigot member telescopically disposed in said socket in radial spaced relation to said axially extending portion, at least one piston member secured on said spigot, said piston member including a radially outwardly projecting shoulder, at least one radially inwardly projecting annulus mounted on said axially extending portion, said piston and annular members being axially spaced to form at least one first chamber therebetween, means to convey a first fluid to said chamber, means to render said chamber fluid tight, a second axially extending wall portion on said socket member, radially spaced from said first wall portion and forming therewith an annular chamber to receive therein said first fluid, diaphragm means positioned between said spigot and socket member and disposed in a position to be contacted on one side by said first fluid and on its opposite side by fluid conveyed through said pipe line, the above parts being so constructed and arranged that surges above and below a datum pressure norm in said pipe line are transmitted by said diaphragm to said first fluid for reaction in said first chamber to compensate for shock in said pipe line.

2. A pipe line slip joint as set forth in claim 1 wherein said first axially extending wall portion has a plurality of inwardly projecting annuli mounted thereon, and said spigot member has a plurality of piston elements mounted thereon and interdigitated with said annuli forming therebetween a plurality of said first chambers.

3. A pipe line slip joint as set forth in claim 1 wherein said diaphragm means bifurcates said annular chamber between said first and second axially extending wall portions, and means connecting said pipe line with the radial outer portion of said diaphragm.

4. A pipe line slip joint as set forth in claim 1 including a pair of annular flanges mounted between said first wall portion and said spigot member but fixedly mounted on one of them, said flanges forming an annular buffer chamber coaxial with said first chamber, another annular flange between said flanges and mounted on the other of them, and an aperture in said fluid filled chamber connecting said buffer chamber.

5. A pipe line slip joint as set forth in claim 1 wherein said first axially extending wall portion has a plurality of inwardly projecting annuli mounted thereon, and said spigot member has a plurality of piston elements mounted thereon and interdigitated with said annuli forming between them a plurality of first chambers, and a plurality of intermediate annular chambers opening to the atmosphere, the effective radial area of said first chambers together being substantially equal to the cross sectional area of the interior of the pipe line.

References Cited by the Examiner

UNITED STATES PATENTS

| | | | |
|---|---|---|---|
| 772,115 | 10/04 | Thompson | 251—54 |
| 853,974 | 5/07 | Hayden | 285—302 |
| 915,502 | 3/09 | Struer | 285—302 |
| 1,548,773 | 8/25 | Ziebarth | 251—54 |
| 2,448,118 | 8/48 | Pellettere | 138—30 |
| 2,663,320 | 12/53 | Snyder | 138—31 |

CARL W. TOMLIN, *Primary Examiner.*

THOMAS F. CALLAGHAN, *Examiner.*